United States Patent [19]

Aoyama et al.

[11] Patent Number: 4,832,906
[45] Date of Patent: May 23, 1989

[54] FUEL ASSEMBLY

[75] Inventors: Motoo Aoyama, Hitachi; Hiromi Maruyama, Katsuta; Yasunori Bessho, Hitachi; Sadao Uchikawa, Katsuta, all of Japan

[73] Assignee: Hitachi, Ltd., Tokyo, Japan

[21] Appl. No.: 850,680

[22] Filed: Apr. 11, 1986

[30] Foreign Application Priority Data

Apr. 12, 1985 [JP] Japan ................... 60-76473

[51] Int. Cl.⁴ .............................. G21C 3/00
[52] U.S. Cl. .................. 376/419; 376/435; 376/455; 376/903; 376/917
[58] Field of Search .......... 376/327, 333, 409, 412, 376/414, 419, 426, 428, 434, 435, 433, 447, 455, 900, 903, 917

[56] References Cited

U.S. PATENT DOCUMENTS

| | | | |
|---|---|---|---|
| 3,179,571 | 4/1965 | Schubert et al. | 376/433 |
| 3,255,092 | 6/1966 | Dee | 376/333 |
| 3,427,222 | 2/1969 | Bianchena et al. | 376/419 |
| 3,823,067 | 7/1974 | Stern et al. | 376/903 |
| 4,059,484 | 11/1977 | Bupp et al. | |
| 4,355,002 | 10/1982 | Hosokawa et al. | 376/419 |
| 4,406,012 | 9/1983 | Gordon et al. | 376/414 |
| 4,587,088 | 5/1986 | Radford | 376/419 |

FOREIGN PATENT DOCUMENTS

| | | |
|---|---|---|
| 0086427 | 2/1983 | European Pat. Off. . |
| 0124775 | 4/1984 | European Pat. Off. . |
| 3308956 | 9/1983 | Fed. Rep. of Germany . |
| 1252674 | 12/1960 | France ................... 376/435 |
| 51-96991 | 8/1976 | Japan ................... 376/419 |
| 59-180388 | 10/1984 | Japan ................... 376/419 |
| 931974 | 7/1963 | United Kingdom ........ 376/333 |
| 1201051 | 4/1968 | United Kingdom . |

OTHER PUBLICATIONS

European Search Report, Jul. 18, 1986, #86 104919.

Primary Examiner—Deborah L. Kyle
Assistant Examiner—R. L. Klein
Attorney, Agent, or Firm—Antonelli, Terry & Wands

[57] ABSTRACT

A fuel assembly comprises a channel box, upper and lower tie plates fixed to the upper and lower portion of the channel box and a bundle of fuel rods enclosed in the channel box and retained by the upper and lower tie plates. The bundle of fuel rods includes ordinary fuel rods containing fissile material not containing gadolinia, and gadolinia-containing rods each containing gadolinia therein and having a larger outer diameter than that of the ordinary fuel rod. The gadolinia-containing rod has pellets enclosed in a closed cladding, and the outer diameters of the pellets also are larger than these of fuel pellets of the ordinary fuel rods.

8 Claims, 5 Drawing Sheets

FIG. 9
| 14 | 13 | 13 | 12 | 12 | 12 | 13 | 14 |
|----|----|----|----|----|----|----|----|
| 13 | 12 | 11 | 15 | 11 | 11 | 12 | 13 |
| 13 | 11 | 11 | 11 | 11 | 11 | 11 | 12 |
| 12 | 15 | 11 | 11 | 16 | 11 | 15 | 12 |
| 13 | 11 | 11 | 16 | 11 | 11 | 11 | 12 |
| 12 | 11 | 11 | 11 | 11 | 11 | 11 | 13 |
| 13 | 12 | 11 | 15 | 11 | 11 | 15 | 13 |
| 14 | 13 | 12 | 12 | 12 | 13 | 13 | 14 |
FIG. 12
| 24 | 23 | 23 | 22 | 22 | 22 | 23 | 24 |
|----|----|----|----|----|----|----|----|
| 23 | 22 | 21 | 21 | 21 | 21 | 22 | 23 |
| 23 | 21 | 25 | 21 | 21 | 25 | 21 | 22 |
| 22 | 21 | 21 | 21 | 21 | 21 | 21 | 22 |
| 22 | 21 | 21 | 21 | 21 | 21 | 21 | 22 |
| 22 | 21 | 25 | 21 | 21 | 25 | 21 | 23 |
| 23 | 22 | 21 | 21 | 21 | 21 | 22 | 23 |
| 24 | 23 | 22 | 22 | 22 | 23 | 23 | 24 |
FIG. 11a
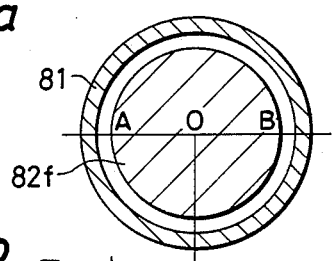
FIG. 10
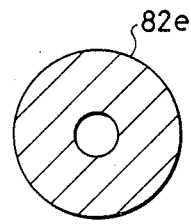
FIG. 11b
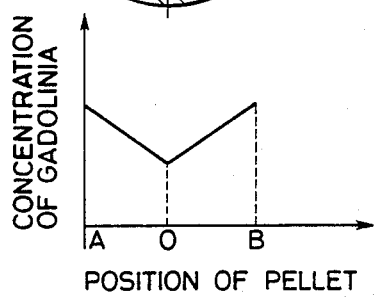

FUEL ASSEMBLY

BACKGROUND OF THE INVENTION

The present invention relates to a fuel assembly, and more particularly to a fuel assembly suitable for a boiling water reactor.

A fuel assembly used for the present boiling water reactor comprises a channel box and a fuel bundle of an $8 \times 8$ lattice which is housed therein, as is shown in FIG. 5 of the paper under the title "Present State and Future Perspectives of BWR Core-Fuel Design" by Toshiaki Enomoto, p.109–116, Journal of the Atomic Energy Society of Japan Vol. 26, No. 2 (1982). The fuel bundle is composed of fuel rods, water rods and special fuel rods which contain a fuel material with burnable poison having a large neutron absorption cross section such as $Gd_2O_3$ added thereto. Such a special fuel rod will be referred to as "a fuel rod containing gadolinia" hereinunder.

In order to operate a nuclear reactor for a certain period, it is necessary for the reactor to have, at the initial stage of operation, an excess reactivity equivalent to the reactivity detracted by burning of fissile material in the reactor operation. On the other hand, it is necessary to control the excess reactivity in order to maintain the reactor in a critical state. For this purpose, a method of inserting a control rod of a neutron absorber into a reactor core has been adopted together with a method of using a fuel assembly having a fuel rod containing gadolinia.

The life time of a fuel assembly could be prolonged by increasing the enrichment of a fissile material in order to improve the fuel economy. However, the increase in enrichment brings about various problems. First, with the increase in enrichment, the excess reactivity which is to be controlled at the early stage of burning fuel is increased, which requires a larger number of fuel rods containing gadolinia than in the prior art. Furthermore, since the average energy of a neutron increases, the effect of each fuel rod containing gadolinia on controlling the excess reactivity reduces. Secondly, if the operational cycle length is to be prolonged with a prolonged life time of fuel, it is necessary to increase the rate of weight of gadolinia, which is unfavorable because it lowers the melting point of a fuel pellet. In addition, with the prolonged life time of fuel, the amount of fission product gas release from the fuel pellets of a fuel rod containing gadolinia becomes greater than that from the fuel pellets of an ordinary fuel rod, and the internal pressure of the fuel rod containing gadolinia increases. This is because the fuel rod containing gadolinia experiences the history wherein the power thereof rapidly increases with the process of burning and when the power of the fuel assembly is at its maximum, the power of the fuel rod also takes its maximum value. As a counter-measure for the increase in internal pressure, a method of reducing the diameter of a fuel pellet containing gadolinia seems to be effective, while the reduced diameter of a fuel pellet containing gadolinia is disclosed in Japanese Patent Laid-Open No. 153987/1979. This method, however, involves the reduction in amount of uranium to be loaded, which is disadvantageous from the viewpoint of fuel economy, and this method cannot solve the above-described problems.

SUMMARY OF THE INVENTION

An object of the present invention is to provide a fuel assembly which is free from the above-described problems involved by prolongation of the life time and which improves the soundness of fuel.

A fuel assembly according to the present invention comprises ordinary fuel rods containing a fissile material but not containing any burnable poison and burnable poison-containing rods each of which has a larger diameter than the above-mentioned fuel rod. The larger diameter burnable poison-containing rod is a burnable poison-containing fuel rod containing both fissile material and burnable poison such as gadolinia, or a solid moderating rod which contains a burnable poison such as gadolinia mixed with material of large slowing-down power for neutron.

BRIEF DESCRIPTION OF THE DRAWINGS

FIG. 9 is a schematic diagram showing a structure of embodiment of a fuel assembly according to the present invention.

FIG. 10 is a plane view of a hollow fuel pellets;

FIG. 11a is a sectional view of a fuel rod employing a fuel pellet of uneven density of gadolinia;

FIG. 11b is a graph showing relationship between radial position and the density of gadolinia; and FIG. 12 is a schematic diagram showing arrangement of a bundle of fuel rods according to another embodiment of the present invention.

DESCRIPTION OF THE PREFERRED EMBODIMENTS

Figure 1:
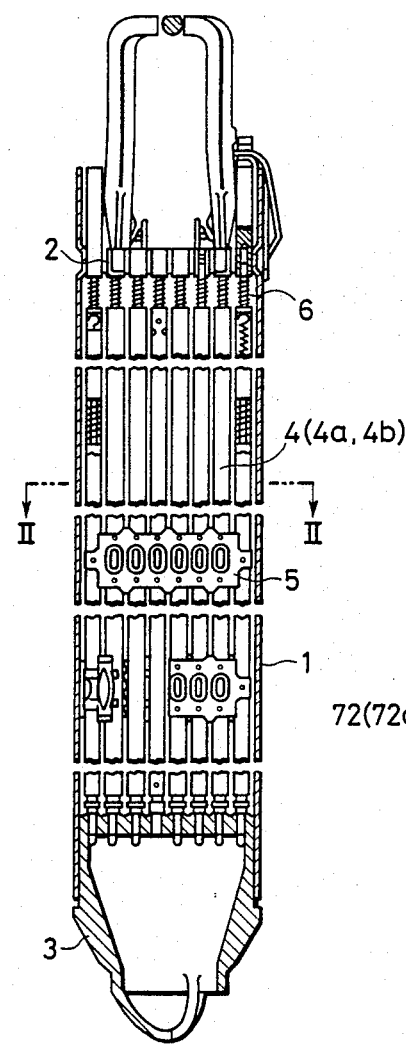
FIG. 1 is a sectional view of an example of a fuel assembly for explaining the present invention.
Figure 2:
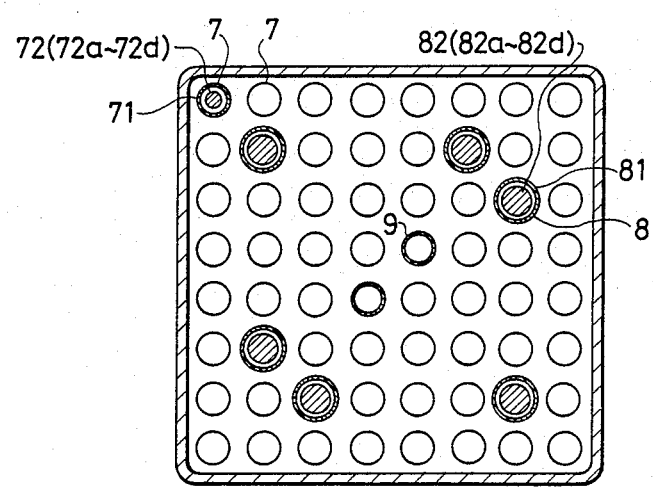
FIG. 2 is a sectional view of the fuel assembly taken along line 2—2 of FIG. 1.

Before presenting a description of the preferred embodiments of a fuel assembly according to the present invention, an aspect of the present invention is described in detail referring to an example of a fuel assembly shown in FIGS. 1 and 2.

In FIGS. 1 and 2, the fuel assembly comprises a channel box 1 axially elongated and having a square cross-section, an upper and lower tie plates 2, 3 fixed to the upper and lower end portions of the channel box 1, respectively, and a fuel bundle 4 of $8 \times 8$ lattice which is inserted in the channel box 1 and retained at the upper and lower ends by the upper and lower tie plates 2,3. A plurality of spacers 5, which are axially distributed, are provided for fixing relative positions between fuel rods. A plurality of expansion springs 6 each are provided on the upper portion of each fuel rod for absorbing fuel rod expansion.

The bundle of fuel rods 4 comprises ordinary fuel rods 7, burnable poison-containing rods 8 whose diameters are larger than the ordinary fuel rods 7, and water rods 9. The fuel rod 7 comprises a closed cladding 71 and fuel pellets 72 containing fissile material. The burnable poison-containing fuel rods 8 each comprise a closed cladding 81 and fuel pellets 82 containing both burnable poison such as gadolinia and fissile material.

Figure 3:
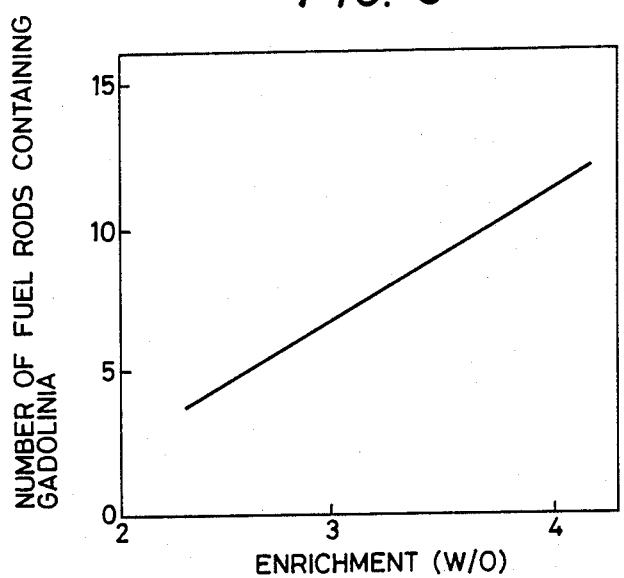
FIG. 3 shows the relationship between the enrichment and the number of fuel rods containing gadolinia.
Figure 4:
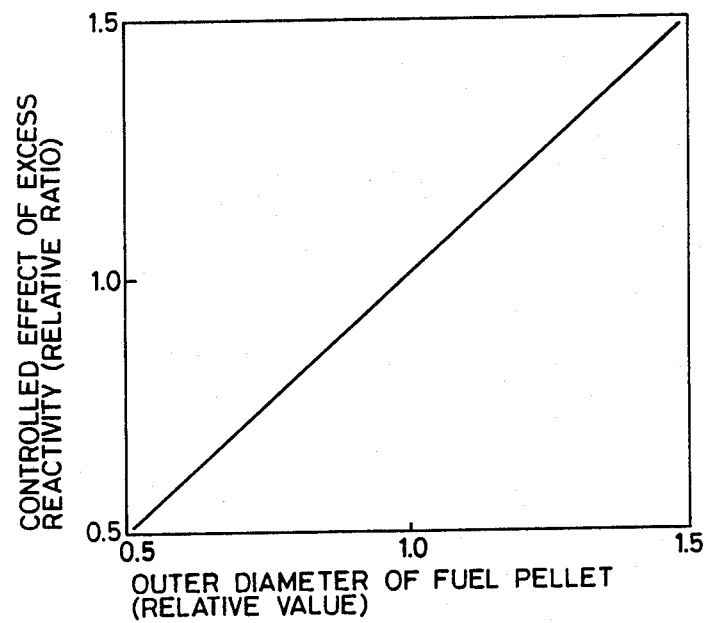
FIG. 4 shows the relationship between the outer diameter of a fuel pellet and the controlled effect of the excess reactivity.

FIG. 3 shows the relationship between the average enrichment of a fuel assembly and the number of fuel rods containing burnable poison required for controlling the excess reactivity. The number of fuel rods containing burnable poison is necessary to increase with the increase in enrichment if they are conventional fuel rods containing burnable poison. The increase in number of fuel rods containing burnable poison, however, generally leads to increase in local power peaking of a fuel assembly. Therefore, the increase in the number of fuel rods containing burnable poison is not preferable. According to the aspect of the present invention, the controlled effect of the excess reactivity per fuel rod containing burnable poison is increased by making the outer diameter of the fuel rod containing burnable poison, namely, the outer diameter of the cladding of the fuel rod larger than the outer diameter of the ordinary fuel rod, namely, the outer diameter of its cladding. To be in more detail, the outer diameter of a fuel pellet containing burnable poison as well as a fissile material with which the cladding of the fuel rod is filled is larger than the diameter of a fuel pellet not containing burnable poison as well as a fissile material with which the cladding of the ordinary fuel rod is filled. The burnable poison such as gadolinia which has a large neutron absorption cross section has a large self-shielding effect, and chiefly absorbs neutrons on the outer peripheral surface of the fuel pellet, so that the larger diameter fuel pellet is effective to increase the controlled effect of the excess reactivity as described before. FIG. 4 shows the relationship between the outer diameter of a fuel pellet containing gadolinia and the controlled effect of the excess reactivity.

Figure 5:
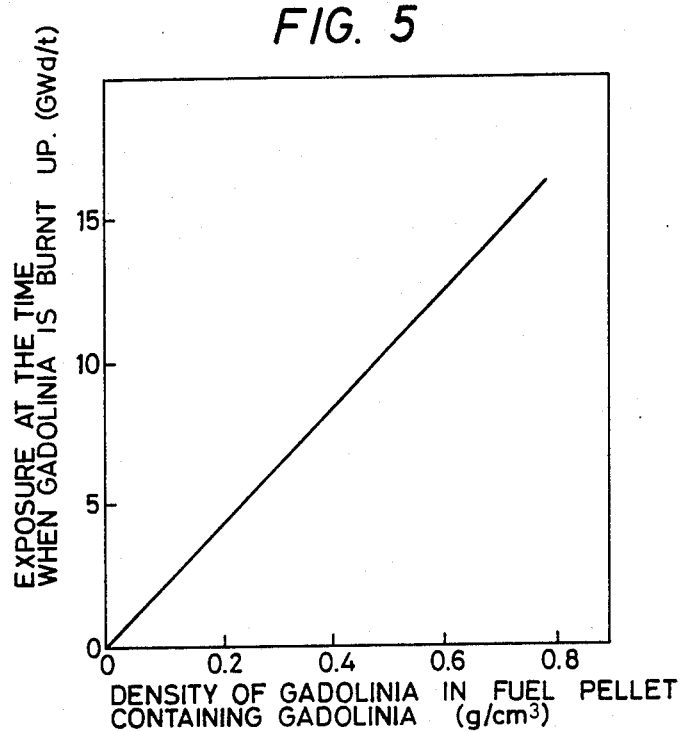
FIG. 5 shows the relationship between the density of gadolinia and the exposure of fuel measured when gadolinia is burnt up.
Figure 6:
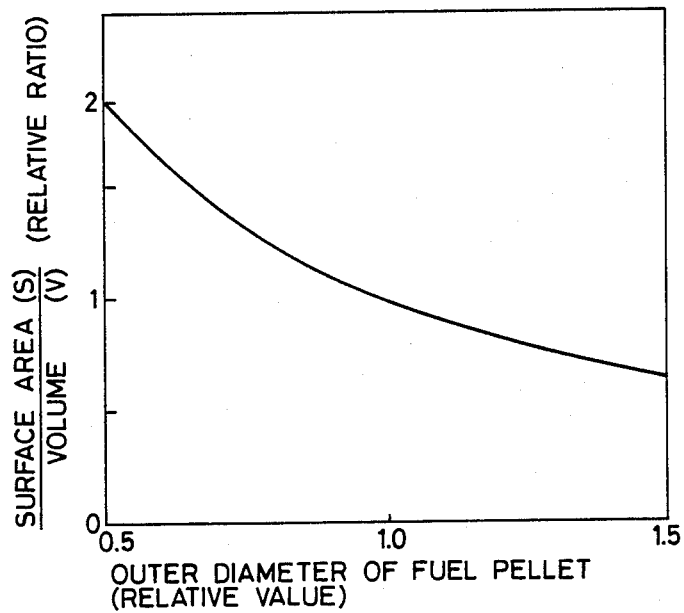
FIG. 6 shows the relationship between the outer diameter of a fuel pellet and S/V.

FIG. 5 shows the relationship between the density of gadolinia which exists in a fuel pellet containing gadolinia at the early stage of burning, and the exposure of the fuel measured at the time when gadolinia is burned up. If the configuration of a fuel pellet is the same, the exposure measured at the time when gadolinia is burned up is approximately proportional to the density of gadolinia, namely, the total number of gadolinia molecules. The aspect of the present invention enables the total number of gadolinia molecules to be increased without increasing the density of gadolinia by increasing the outer diameter of the fuel pellet containing gadolinia. Furthermore, as shown in FIG. 6, with the increase in diameter of a fuel pellet, the ratio of the surface area to the volume of the fuel reduces. As a result, the reduction of gadolinia due to neutron absorption is slow as compared with a burnable poison containing fuel rod of the same diameter as that of the ordinary fuel rod, for example. If the total number of gadolinia molecules in the fuel is the same, it is possible to slow the rate of gadolinia being burnt up, thereby enabling the control of the excess reactivity suitable for a long operational cycle.

Figure 7:
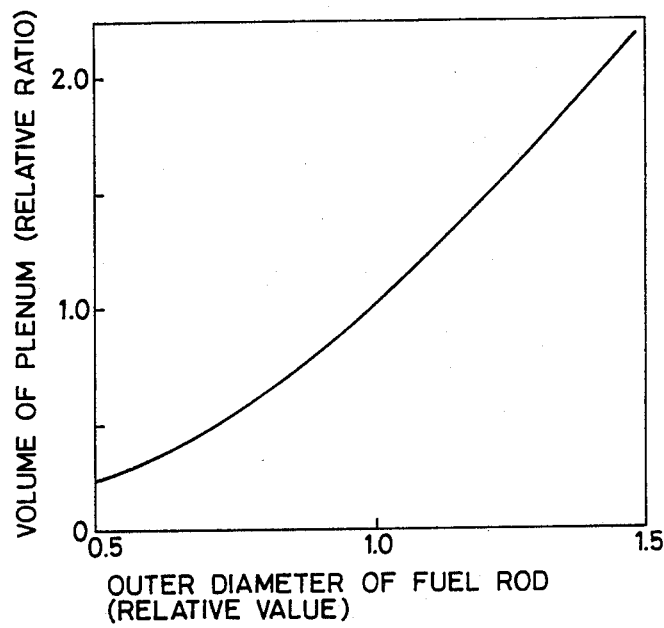
FIG. 7 shows the relationship between the outer diameter of the fuel rod and the volume of plenum.

The increase in the outer diameter of a fuel pellet containing burnable poison necessitates increase in outer diameter of the fuel cladding. As a result, the volume of plenum increases, as shown in FIG. 7, and it is possible to prevent the afore-mentioned rise in internal pressure.

According to another aspect of the present invention, the fuel assembly comprises the ordinary fuel rods 7 as mentioned above and solid moderating rods which contain material of slowing-down power for neutron and burnable poison mixed with the material and have larger diameters than the ordinary fuel rods 7. The fuel assembly has an advantage to increase the neutron moderating effect at the time when the gadolinia is burnt up, as well as producing the above-described effect.

Figure 8:
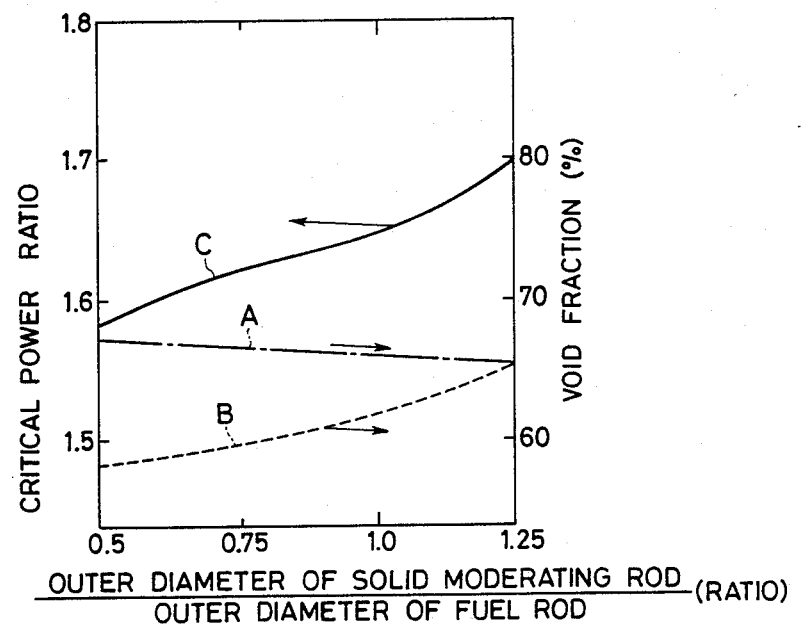
FIG. 8 shows the relationship between the outer diameter of the fuel rod and the thermal allowance.

Since the exothermic ratio of such a solid moderating rod is low in comparison with that of a fuel rod, the improvement of the thermal allowance will be expected by making the outer diameter of the solid moderating rod larger than that of the fuel rod. That is, if the outer diameter of the solid moderating rod is made larger, the pressure loss in the vicinity of the solid moderating rod is increased, whereby the flow rate of the coolant therearound is reduced, while the flow rate of the coolant around the fuel rod which has a higher exothermic ratio is increased. At this time, the distribution of void fraction becomes even within the fuel assembly and the thermal allowance increases. FIG. 8 shows the void fraction (curve A) around the fuel rod, the void fraction (curve B) around the solid moderating rod, and the thermal allowance (curve C) which is represented by critical power ratio, wherein the abscissa represents the ratio of the outer diameter of the solid moderating rod to the outer diameter of the fuel rod. As is clear from FIG. 8, when the ratio of the outer diameter of the solid moderating rod to the outer diameter of the fuel rod increases from, e.g., 1.0 to 1.1, the distribution of the void fraction becomes even, the critical power ratio increases from 1.650 to 1.668, and the thermal allowance increase by 1.1%.

As described above, the fuel assembly according to the present invention enables the control of the excess reactivity which is suitable for long-life fuel and enables the internal pressure of a fuel rod containing burnable poison such as gadolinia to be reduced by making the outer diameter of the fuel rod (fuel pellet) containing burnable poison larger than that of an ordinary fuel rod which does not contain burnable poison. Furthermore, since the amount of uranium to be loaded increases with the increase in outer diameter of the fuel rod containing burnable poison, the number of reload assemblies in the batches can be reduced, which leads to the enhancement of fuel economy.

An embodiment of the fuel assembly according to the present invention is described referring to FIG. 9 in addition to FIGS. 1 and 2.

FIG. 9 shows an arrangement of a bundle of rods of 8×8 lattice in the fuel assembly. The other construction is the same as shown in FIGS. 1, 2. Namely the fuel assembly comprises channel box 1, upper and lower tie plates 2, 3 fixed to the channel box 1, a bundle of fuel rods 4a, and spacers 5.

The bundle of fuel rods 4a according to this embodiment comprises fuel rods 11 to 14, and water rods 16. The fuel rods 11 to 14 each are constructed of a cladding 71 sealingly closed at both ends by plugs and fuel pellets 72a–72d enclosed in the cladding. The fuel rods 15 each are composed of a cladding 81 closed sealingly at both ends by plugs and fuel pellets 82a inclosed in the cladding and containing gadolinium. The fuel pellets 72a–72d, 82a which are charged into the fuel rods 11 to 15 have the respective compositions shown in the rod Nos. 11 to 15 of Table 1. The outer diameter of the fuel rods 11 to 14 is 12.3 mm, and the outer diameter of the fuel rod 15 containing gadolinia is 13.5 mm. The fuel pellets 72a-72d of the fuel rods 11 to 14 each containg fissile material, uranium 2235, but do not contain burnable poison, gadolinia. The thickness of these fuel rods 11 to 15 is equal to each other.

TABLE 1

| Rod No. | 11 | 12 | 13 | 14 | 15 |
|---|---|---|---|---|---|
| Enrichment (wt %) | 3.4 | 2.5 | 2.2 | 1.7 | 2.2 |
| Weight Ratio of Gadolinia | — | — | — | — | 2.5 |
| Number of Rods Used | 26 | 15 | 12 | 4 | 5 |

In the prior art in which the outer diameter of all the fuel rods is 12.3 mm, the number of fuel rods containing gadolinia is 6, the enrichment is 2.5 wt %, and the weight ratio of gadolinia is 3 wt % (in the case of 9-month operational cycle). In this embodiment, the outer diameter of the fuel rod 15 containing gadolinia is made 1.1 times as large as that of a conventional fuel rod, whereby the number of fuel rods 15 containing gadolinia is reduced by one and the weight ratio of gadolinia is reduced by 0.5 wt %. Furthermore, the increase in outer diameter of the fuel rods 15 containing gadolinia increases the volume of plenum in the fuel rod 15, so that the internal pressure of the fuel rod 15 containing is lowered by 17%, which leads to the improvement of the soundness of the fuel rod 15 containing gadolinia.

According to this embodiment, since the increase in the outer diameter of the fuel rod 15 containing gadolinia increases the amount of uranium which can be loaded into the fuel assembly increases by about 2% in comparison with that in the prior art, it is possible to prolong the life time of the fuel assembly and to improve the soundness of the fuel rod containing gadolinia.

The fuel rods 15 containing gadolinia is able to employ hollow pellets 82e as shown in FIG. 10. The hollow fuel pellet 82e increases the ratio of atoms of hydrogen to fuel in the unit cell of the fuel rod containing gadolinia, and reduces the average energy of a neutron, thereby increasing the neutron absorbing effect of gadolinia. Furthermore, the hollowness lowers the maximum temperature of the fuel, so that the amount of fission product gas release (e.g., I, Xe and Kr gas) is lowered and the volume for storing the fission product gas increases. When the outer diameter of the shallow pellets 82e is 1.15 times as large as that of the conventional fuel pellets, that is, 14.1 mm and the inner diameter of 3 mm and which contain gadolinia of the same content as in Table 1, and the other conditions are the same as the above embodiment, the internal pressure of the fuel rods 15 containing gadolinia is reduced by about 50%. If the inner surface of the cladding of the fuel rod containing gadolinia is lined with Zr or Cu, the soundness of fuel is further enhanced.

It is possible to raise the concentration of gadolinia in proportion to the distance from the center of a fuel pellet 82f in cladding 81 of the fuel rod 15 containing gadolinia in the first embodiment, as shown in FIGS. 11a, 11b, by means of the radial distribution of concentration of gadolinia in the fuel pellet. In this embodiment, if the distribution of gadolinia in the pellet is varied, the controlled effect of the excess reactivity at the early stage of burning is increased without increasing the total number of gadolinia molecules in the fuel pellet 82f. In addition, since the gadolinia remaining unburnt in the center of the fuel pellet is reduced, the economical efficiency in fuel is improved.

Another embodiment of the fuel assembly according to the present invention is described referring to FIG. 12.

The fuel assembly of this embodiment is the same as is shown FIGS. 1 and 2 except for a bundle of fuel rods. The bundle of fuel rods according to this embodiment is shown in FIG. 12, and comprises fuel rods 21 to 24 and solid moderating rods 25 constructed of a cladding and pellets containing gadolinia. The solid moderating rods 25 is used in place of the fuel rod 15 containing gadolinia. The outer diameter of the solid moderating rod 25 is 14.8 mm, 1.2 times as large as that of fuel rods 21 to 24. The structure of the fuel rods 21 to 24 are the same as that of the fuel rods 11 to 14. Each of the solid moderating rod 25 containing gadolinia surrounded by the fuel rods 21 to 24 is composed of the cladding both ends of which are sealed and which are filled with gadolinia and a solid moderator. The fuel pellets have the respective components shown in Nos. 21 to 24 of Table 2. As the moderator which is charged into the solid moderating rod containing gadolinium, zirconium hydride, which has a larger hydrogen density than light water (70 atm, 290° C.), is used. If the total number of the gadolinium molecules in the solid moderating rod 25 containing gadolinia is made equal to that of the gadolinia molecules in the fuel rod 15 containing gadolinium in the first embodiment, the concentration of gadolinium is about 0.20 g/cm². Accordingly, four solid moderating rods 25 containing gadolinia are enough to control the excess reactivity as in the first embodiment.

Since the solid moderating rod works as a moderator for neutrons in the central part of the fuel assembly after gadolinium is burnt up in this embodiment, it is possible to save uranium by about 2%.

TABLE 2

| Rod No. | 21 | 22 | 23 | 24 |
|---|---|---|---|---|
| Enrichment (wt %) | 3.4 | 2.4 | 2.2 | 1.7 |
| Number of Rods Used | 28 | 16 | 12 | 4 |

The above embodiments can be applied not only to the fuel assembly used for a boiling water reactor but also to a fuel assembly used for a pressurized water reactor.

What is claimed is:

1. A fuel assembly comprising:

a channel box axially elongated;

upper and lower tie plates fixed to upper and lower end portions of said channel box, respectively;

first fuel rods each inserted in said channel box and retained by said upper and lower tie plates, each of said first fuel rods including a closed cladding and fuel pellets, enclosed in said closed cladding, containing fissile material and being free of burnable poison; and second fuel rods each inserted in said channel box and retained by said upper and lower tie plates, each of said second fuel rods including a closed cladding and fuel pellets, enclosed in said closed cladding and containing fissile material and burnable poison, wherein the outer diameters of said fuel pellets of said second fuel rods are larger than that of said fuel pellets of said first fuel rods.

2. The fuel assembly as defined in claim 1, wherein each of said fuel pellets of said second fuel rods containing gadolinia as said burnable poison, and has a hole at the central portion thereof.

3. A fuel assembly comprising a channel box axially elongated; upper and lower tie plates fixed to upper and lower end portions of said channel box, respectively; first fuel rods each inserted in said channel box, retained by said upper and lower tie plates and comprising a closed cladding and first fuel pellets disposed in said closed cladding, each of said first fuel pellets containing fissile material but not containing gadolinia and second gadolinia-containing fuel rods each inserted in said channel box, retained by said upper and lower tie plates and comprising a closed cladding and second gadolinia-containing fuel pellets in said closed cladding, each of said second gadolinia-containing fuel pellets containing fissile material and gadolinia, wherein the outer diameter of said each second gadolinia-containing fuel rod and the outer diameter of each second gadolinia-containing fuel pellet are larger than that of said first fuel rod and that of said each first fuel pellet, respectively.

4. The fuel assembly as defined in claim 1, wherein said gadolinia-containing fuel pellets each are hollow and have a central hole.

5. The fuel assembly as defined in claim 1, wherein said gadolinia-containing fuel pellets each contained in said cladding and having a density of fissile material which is greater in the outer preipheral portion than its central portion.

6. The fuel assembly as defined in claim 3, wherein said rod gadolinia-containing fuel is a solid moderating rod containing solid material of slowing-down for neutron and gadolinia in said cladding.

7. A fuel assembly comprising:

a channel box axially elongated;

upper and lower tie plates fixed to upper and lower end portions of said channel box, respectively;

first fuel rods each inserted in said channel box and retained by said upper and lower tie plates, each of said first fuel rods including a closed cladding and fuel pellets, enclosed in said closed cladding, containing fissile material and being free of burnable poison; and second fuel rods each inserted in said channel box and retained by said upper and lower tie plates, each of said second fuel rods including a closed cladding and fuel pellets, enclosed in said closed cladding and containing fissile material and burnable poison, wherein the outer diameters of said fuel pellets of said second fuel rods are larger than that of said fuel pellets of said first fuel rods, wherein the outer diameter of each of said second fuel rods is larger than that of each of said first fuel rods.

8. The fuel assembly as defined in claim 7, wherein the inner surface of each of said second fuel rods is lined with one of Zr and Cu.

* * * * *